United States Patent
Wang et al.

(10) Patent No.: US 8,730,628 B2
(45) Date of Patent: May 20, 2014

(54) ELECTROSTATIC PROTECTION CIRCUIT CAPABLE OF PREVENTING LATCH-UP EFFECT

(75) Inventors: Chang-Tzu Wang, Taoyuan County (TW); Tien-Hao Tang, Hsinchu (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 420 days.

(21) Appl. No.: 13/281,456

(22) Filed: Oct. 26, 2011

(65) Prior Publication Data

US 2013/0107402 A1    May 2, 2013

(51) Int. Cl.
*H02H 9/00*    (2006.01)
(52) U.S. Cl.
USPC ............................................................ 361/56
(58) Field of Classification Search
USPC ............................................................ 361/56
See application file for complete search history.

(56) References Cited

U.S. PATENT DOCUMENTS

| | | | |
|---|---|---|---|
| 7,166,876 B2* | 1/2007 | Huang | 257/213 |
| 7,282,402 B2* | 10/2007 | Sadaka et al. | 438/221 |
| 7,569,869 B2* | 8/2009 | Jin et al. | 257/190 |
| 7,645,651 B2* | 1/2010 | Huang et al. | 438/163 |
| 7,781,839 B2* | 8/2010 | Thean et al. | 257/350 |

* cited by examiner

*Primary Examiner* — Stephen W Jackson
(74) *Attorney, Agent, or Firm* — Winston Hsu; Scott Margo

(57) ABSTRACT

An electrostatic protection circuit includes a strained transistor array, an unstrained transistor, and a control circuit. The strained transistor array has a first end electrically connected to a bias terminal. The unstrained transistor has a first end electrically connected to the bias terminal. The control circuit is electrically connected to a second end of the strained transistor array, a second end of the unstrained transistor and a ground terminal. The control circuit controls impedance between the second end of the strained transistor array and the ground terminal according to current flowing through the unstrained transistor. The electrostatic protection circuit is capable of preventing latch-up effect.

15 Claims, 6 Drawing Sheets

US 8,730,628 B2

ELECTROSTATIC PROTECTION CIRCUIT CAPABLE OF PREVENTING LATCH-UP EFFECT

BACKGROUND OF THE INVENTION

1. Field of the Invention

The present invention relates to an electrostatic protection circuit, and more particularly, to an electrostatic protection circuit capable of preventing latch-up effect.

2. Description of the Prior Art

Electrostatic protection is an important topic in the electronics industry and the semiconductor industry. Electrostatic discharge may cause damage to electronic products. As semiconductor manufacturing processes keep improving, scale of an integrated circuit is getting smaller, so that it also becomes easier to damage the integrated circuits when suffering the electrostatic discharge. In order to prevent the integrated circuit from being damaged by the electrostatic discharge, when an electrostatic protection circuit receives static electricity, the electrostatic protection circuit must be able to allow large current to pass through, in order to conduct the static electricity to a ground terminal immediately. Therefore, electron mobility of a transistor of the electrostatic protection circuit is very important. The better the electron mobility of the transistor is, the better the electrostatic protection ability of the electrostatic protection circuit will be.

SUMMARY OF THE INVENTION

The present invention provides an electrostatic protection circuit capable of preventing latch-up effect. The electrostatic protection circuit comprises a strained transistor array with a first end electrically connected to a bias terminal, an unstrained transistor with a first end electrically connected to the bias terminal, and a control circuit electrically connected to a second end of the strained transistor array, a second end of the unstrained transistor and a ground terminal, for controlling impedance between the second end of the strained transistor array and the ground terminal according to current flowing through the unstrained transistor.

The present invention further provides a method for performing electrostatic protection. The method comprise providing an electrostatic protection circuit, the electrostatic protection circuit comprising a strained transistor array coupled between a bias terminal and a ground terminal, and an unstrained transistor coupled between the bias terminal and the ground terminal; and controlling impedance between the strained transistor array and the ground terminal according to current flowing through the unstrained transistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
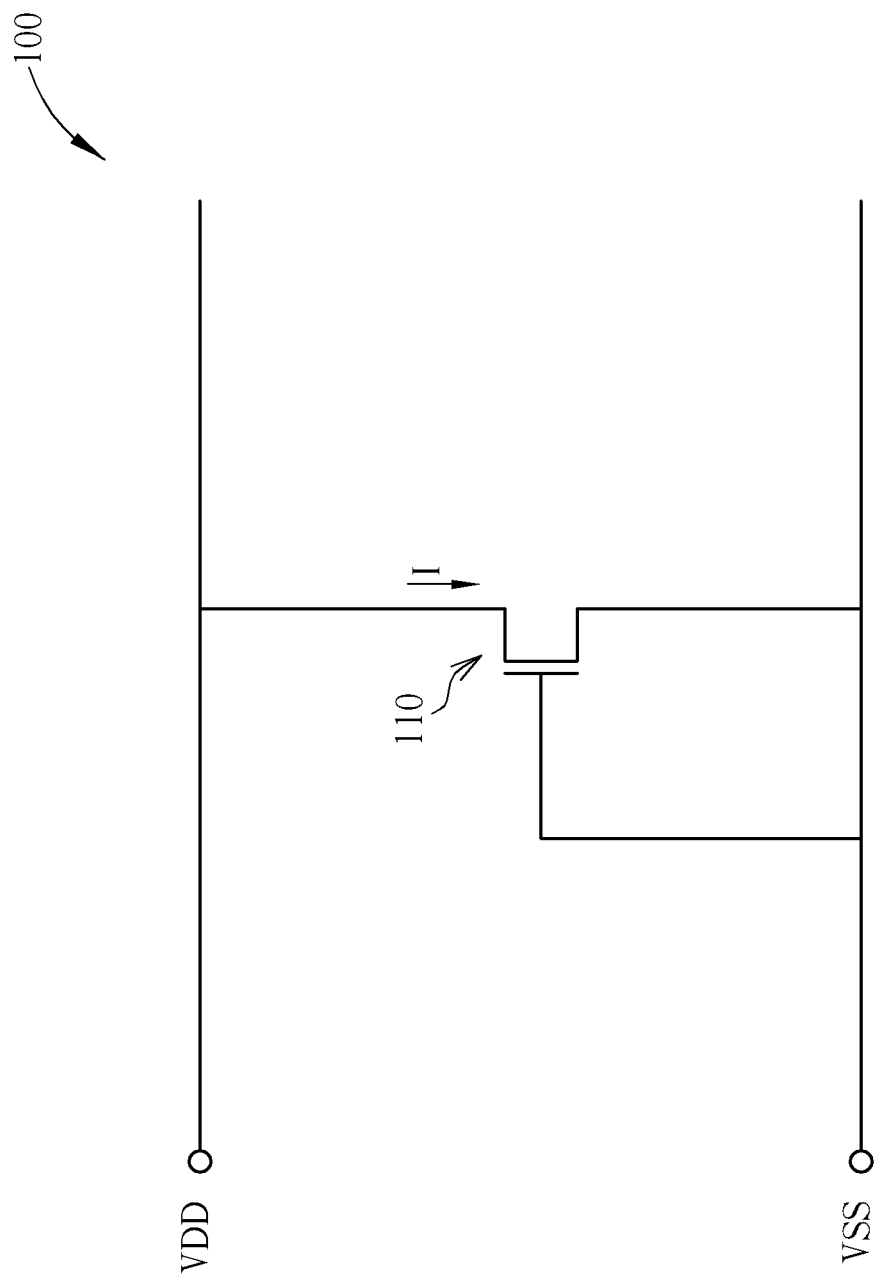
FIG. 1 is a diagram showing an electrostatic protection circuit.

Please refer to FIG. 1, which is a diagram showing an electrostatic protection circuit 100. The electrostatic protection circuit 100 comprises a transistor array 110 formed of a plurality of transistors. A first end of the transistor array 110 is electrically connected to a bias terminal VDD, and a second end and a control end of the transistor array 110 are electrically connected to a ground terminal VSS. When the bias terminal VDD receives static electricity, a voltage value of the bias terminal VDD increases rapidly, and further increases a voltage difference between the first end and the second end of the transistor array 110. When the voltage difference between the first end and the second end of the transistor array 110 is greater than a breakdown voltage, conduction between the first end and the second end of the transistor array 110 is allowed to let current I pass through, in order to conduct the static electricity to the ground terminal VSS.

Figure 2:
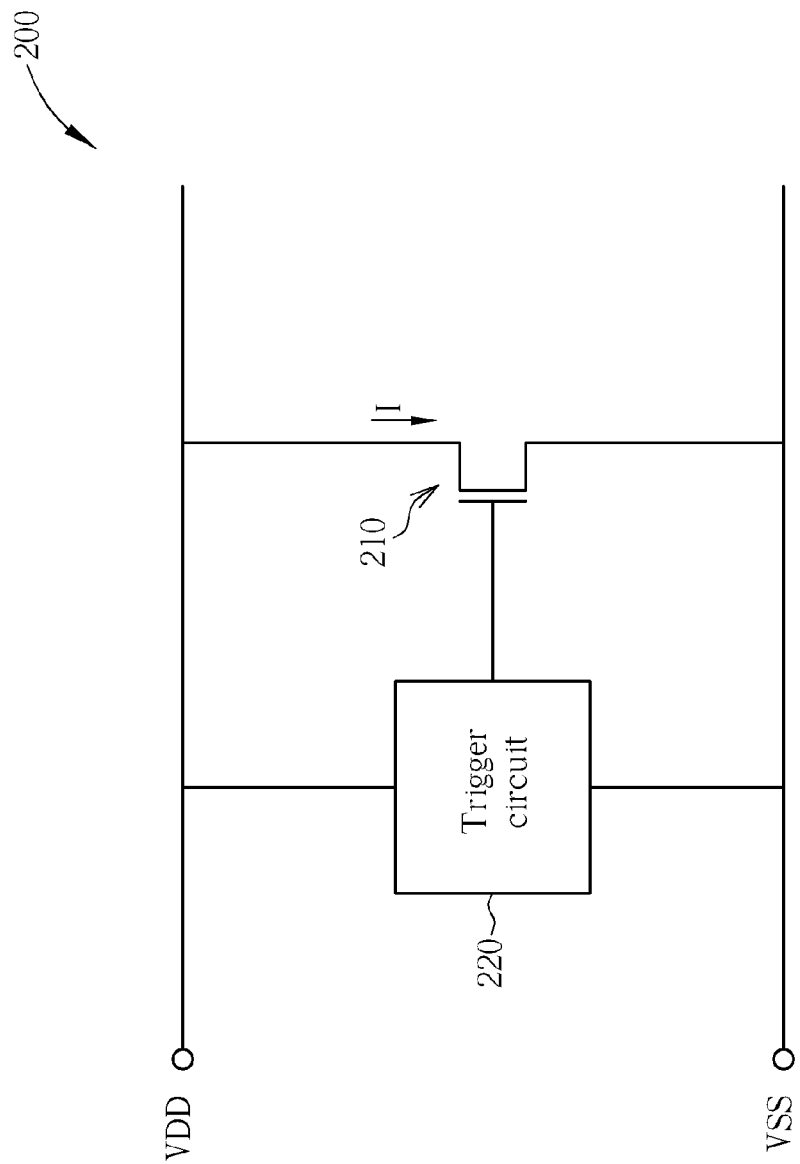
FIG. 2 is a diagram showing another electrostatic protection circuit.

Please refer to FIG. 2, which is a diagram showing another electrostatic protection circuit 200. The electrostatic protection circuit 200 comprises a transistor array 210 and a trigger circuit 220. A first end of the transistor array 210 is electrically connected to a bias terminal VDD, a second end of the transistor array 210 is electrically connected to a ground terminal VSS, and a control end of the transistor array 210 is electrically connected to the trigger circuit 220. The trigger circuit 220 is electrically connected between the bias terminal VDD and the ground terminal VSS for controlling on and off states of the transistor array 210 according to a voltage value of the bias terminal VDD. When the bias terminal receives static electricity, the voltage value of the bias terminal VDD increases rapidly, and the trigger circuit 220 turns on the transistor array 210 due to the increased voltage value of the bias terminal VDD, such that conduction between the first end and the second end of the transistor array 210 is allowed to let current I pass through, in order to conduct the static electricity to the ground terminal VSS.

Figure 3:
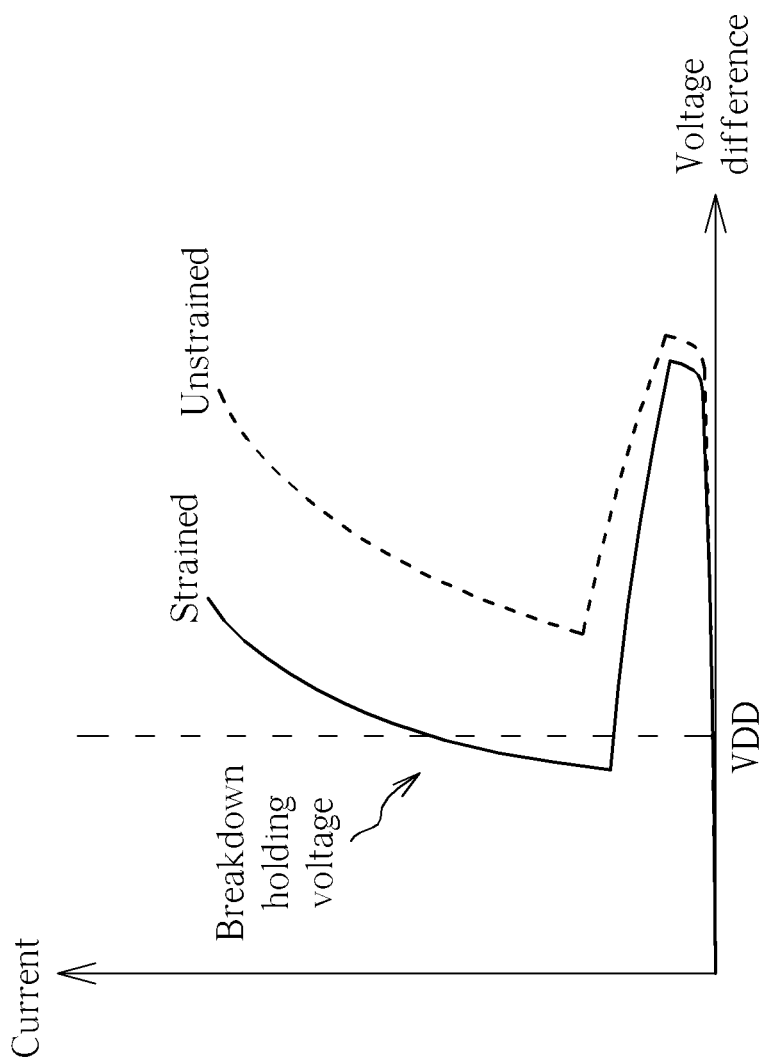
FIG. 3 is a diagram showing characteristic curves of a strained transistor and an unstrained transistor.

Please refer to FIG. 3, which is a diagram showing characteristic curves of a strained transistor and an unstrained transistor. In order to improve electron mobility of a transistor for allowing larger current to pass through, current semiconductor manufacturing processes change a transistor from an unstrained transistor to a strained transistor by adjusting semiconductor materials. As shown in FIG. 3, for a same voltage difference (a voltage difference between the first end and the second end of the transistor), the strained transistor is able to allow larger current to pass through. However, a breakdown holding voltage of the strained transistor becomes lower accordingly. When the breakdown holding voltage of the strained transistor is smaller than the voltage of the bias terminal VDD, the strained transistor keeps staying in a breakdown state after the strained transistor is broken down, such that the strained transistor is unable to return to a normal state. The above situation is the so-called latch-up effect. When the strained transistor is in the latch-up state, the current keeps flowing from the bias terminal VDD to the ground terminal VSS, such that the strained transistor may be damaged.

Figure 4:
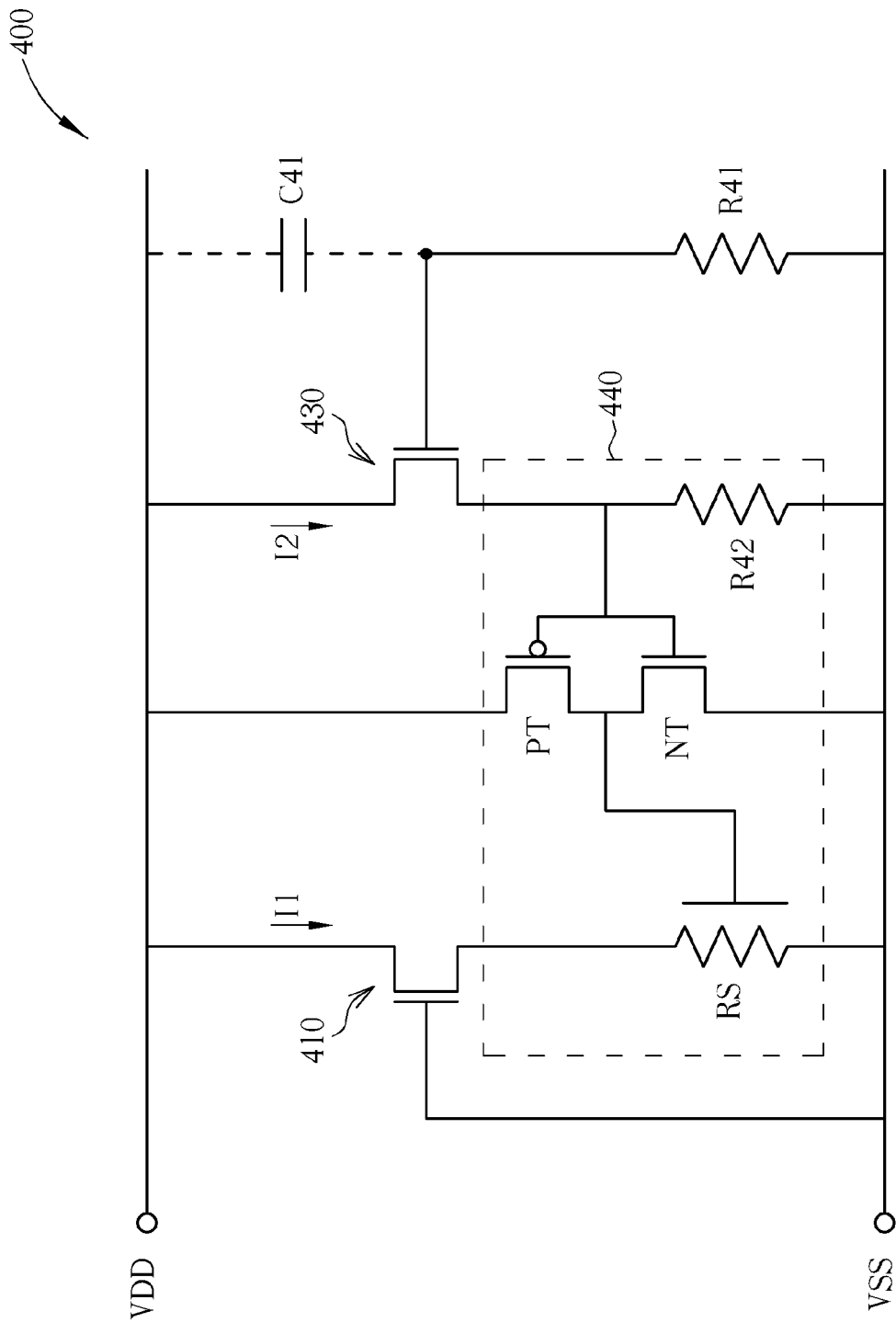
FIG. 4 is a diagram showing a first embodiment of an electrostatic protection circuit of the present invention.

Please refer to FIG. 4, which is a diagram showing a first embodiment of an electrostatic protection circuit of the present invention. As shown in FIG. 4, the electrostatic protection circuit 400 comprises a strained transistor array 410, an unstrained transistor 430, a resistor R41, and a control circuit 440. A first end of the strained transistor array 410 is electrically connected to a bias terminal VDD, a second end of the strained transistor array 410 is electrically connected to the control circuit 440, and a control end of the strained transistor array 410 is electrically connected to a ground terminal VSS. A first end of the unstrained transistor 430 is electrically connected to the bias terminal VDD, and a second end of the unstrained transistor 430 is electrically connected to the control circuit 440. In addition, a parasitic capacitor C41 is electrically connected between a control end of the unstrained transistor 430 and the ground terminal VSS. The resistor R41 is electrically connected between the control end of the unstrained transistor 430 and the ground terminal VSS. The control circuit 440 is electrically connected to the second end of the strained transistor array 410, the second end of the unstrained transistor 430 and the ground terminal VSS, for controlling impedance between the second end of the strained transistor array 410 and the ground terminal VSS according to current I2 flowing through the unstrained transistor 430.

The control circuit 440 comprises a P-type transistor PT, an N-type transistor NT, a resistor R42, and a variable impedance element RS (such as a variable resistor). A source end of the P-type transistor PT is electrically connected to the bias terminal VDD. A gate end of the P-type transistor PT is electrically connected to the second end of the unstrained transistor 430. A drain end of the N-type transistor NT is electrically connected to a drain of the P-type transistor PT. A gate end of the N-type transistor NT is electrically connected to the second end of the unstrained transistor 430. A source end of the N-type transistor NT is electrically connected to the ground terminal VSS. The resistor R42 is electrically connected between the second end of the unstrained transistor 430 and the ground terminal VSS. The variable impedance element RS is electrically connected between the second end of the strained transistor array 410 and the ground terminal VSS, and a control end of the variable impedance element RS is electrically connected to the drain end of the P-type transistor PT. The variable impedance element RS changes its resistance according to a voltage level of the control end of the variable impedance element RS. When the voltage level of the control end of the variable impedance element RS is higher, the resistance of the variable impedance element RS is larger; and when the voltage level of the control end of the variable impedance element RS is lower, the resistance of the variable impedance element RS is smaller.

According to the above arrangement, when the bias terminal VDD receives static electricity, a voltage value of the bias terminal VDD increases rapidly, and further increases a voltage difference between the bias terminal VDD and the ground terminal VSS, such that the strained transistor array 410 and the unstrained transistor 430 are broken down. Currents I1 and I2 flow through the strained transistor array 410 and the unstrained transistor 430 from the bias terminal VDD to the ground terminal VSS respectively, in order to eliminate the static electricity. The parasitic capacitor C41 and the resistor R41 form a delay circuit to delay a turn-off time of the unstrained transistor 430. In addition, when the current I2 flowing through the unstrained transistor 430 is greater than a predetermined value, a voltage level of the second end of the unstrained transistor 430 is at a logic high level, such that the P-type transistor PT is turned off and the N-type transistor NT is turned on. Therefore, the voltage value at the control end of the variable impedance element RS is decreased and further reduces the resistance of the variable impedance element RS. The current I1 flowing through the strained transistor array 410 becomes larger consequently.

When the unstrained transistor 430 is turned off, the current I2 is not allowed to flow through the unstrained transistor 430 (or the current I2 flowing through the unstrained transistor 430 is smaller than a predetermined value), such that the voltage level of the second end of the unstrained transistor 430 becomes a logic low level, thus the P-type transistor PT is turned on and the N-type transistor NT is turned off. Therefore, the voltage value at the control end of the variable impedance element RS is increased and further increases the resistance of the variable impedance element RS. Even if the strained transistor array 410 is still in the latch-up status, the current I1 flowing through the strained transistor array 410 becomes smaller due to the increased resistance between the second end of the strained transistor array 410 and the ground terminal VSS. The strained transistor array 410 is then recovered from the latch-up state to the normal state.

Figure 5:
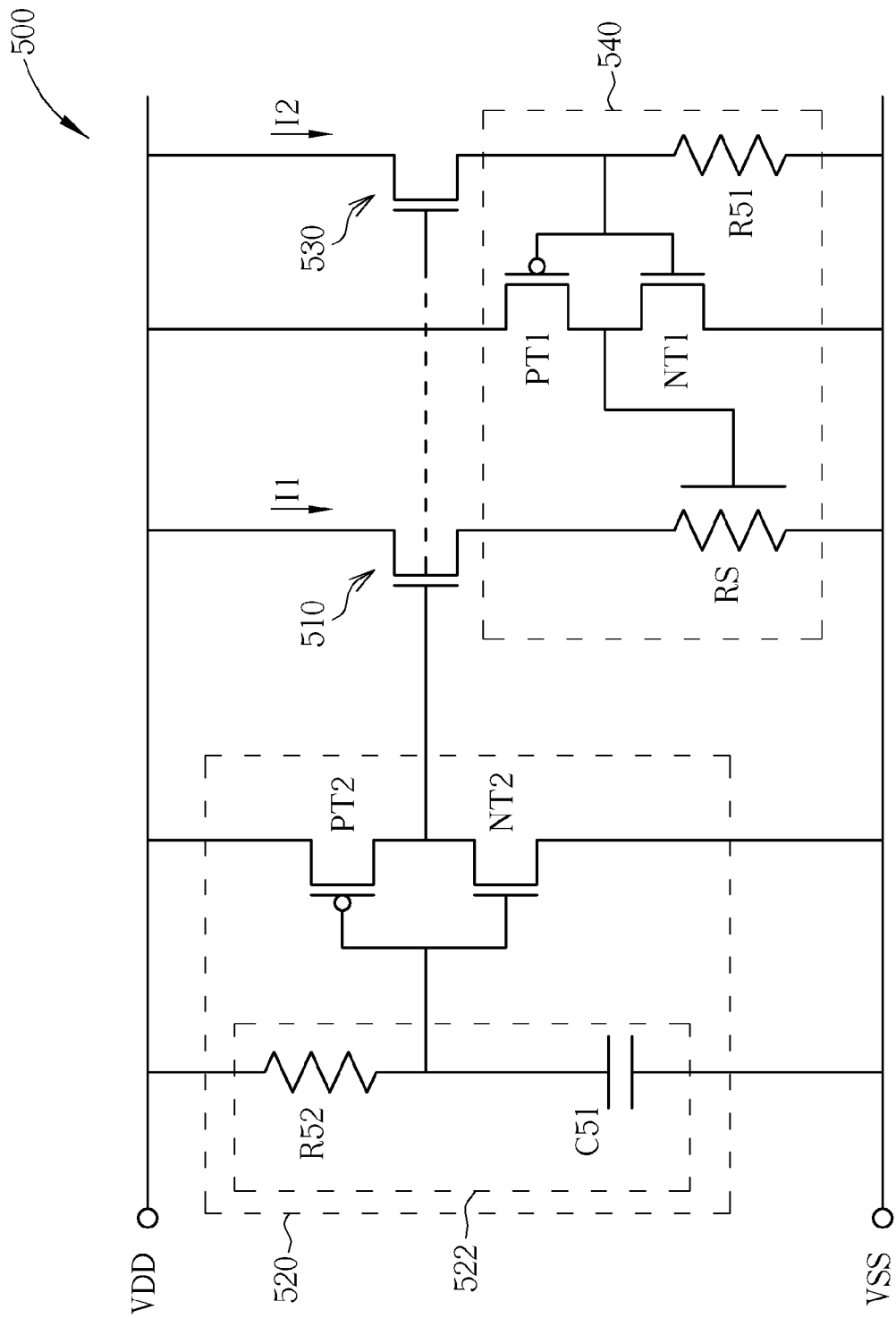
FIG. 5 is a diagram showing a second embodiment of an electrostatic protection circuit of the present invention.

Please refer to FIG. 5, which is a diagram showing a second embodiment of an electrostatic protection circuit of the present invention. Operation theories of a strained transistor array 510, an unstrained transistor 530 and a control circuit 540 shown in FIG. 5 are similar to operation theories of the strained transistor array 410, the unstrained transistor 430, and the control circuit 440 shown in FIG. 4. The electrostatic protection circuit 500 of FIG. 5 further comprises a trigger circuit 520 for controlling on and off states of the strained transistor array 510 and the unstrained transistor 530 according to a voltage value of the bias terminal VDD. The trigger circuit 520 comprises a delay element 522, a P-type transistor PT2 and an N-type transistor NT. The delay element 522 is for controlling on and off periods of the strained transistor array 510 and the unstrained transistor 530. The delay element 522 can be formed by a resistor R52 and a capacitor C51 serially connected to each other.

According to the above arrangement, when the bias terminal VDD receives static electricity, a voltage value of the bias terminal VDD increases rapidly as well as a voltage value of a source end of the P-type transistor PT2, where a voltage value of a gate end of the P-type transistor PT2 increases slowly due to the delay element 522, such that the P-type transistor PT2 is turned on. The strained transistor array 510 and the unstrained transistor 530 are turned on since the P-type transistor PT2 is turned on. Currents I1 and I2 flow through the strained transistor array 410 and the unstrained transistor 430 from the bias terminal VDD to the ground terminal VSS respectively, in order to eliminate the static electricity. Similarly, when the unstrained transistor 430 is turned on, the P-type transistor PT1 is turned off and the N-type transistor PT1 is turned on accordingly. Therefore, the voltage value at the control end of the variable impedance element RS is decreased and further reduces the resistance of the variable impedance element RS. The current I1 flowing through the strained transistor array 510 becomes larger consequently.

When the voltage at the gate end of the P-type transistor PT2 increases to a certain level to turn off the P-type transistor PT2, a voltage at a drain end of the P-type transistor PT2 is decreased, such that the strained transistor array 510 and the unstrained transistor 530 are turned off. Similarly, when the unstrained transistor 430 is turned off, the P-type transistor PT1 is turned on and the N-type transistor PT1 is turned off accordingly. Therefore, the voltage value at the control end of the variable impedance element RS is increased and further increases the resistance of the variable impedance element RS. Even if the strained transistor array 510 is still in the latch-up state, the current I1 flowing through the strained transistor array 510 becomes smaller due to the increased resistance between the second end of the strained transistor array 510 and the ground terminal VSS. The strained transistor array 510 is then recovered from the latch-up state to the normal state.

Figure 6:
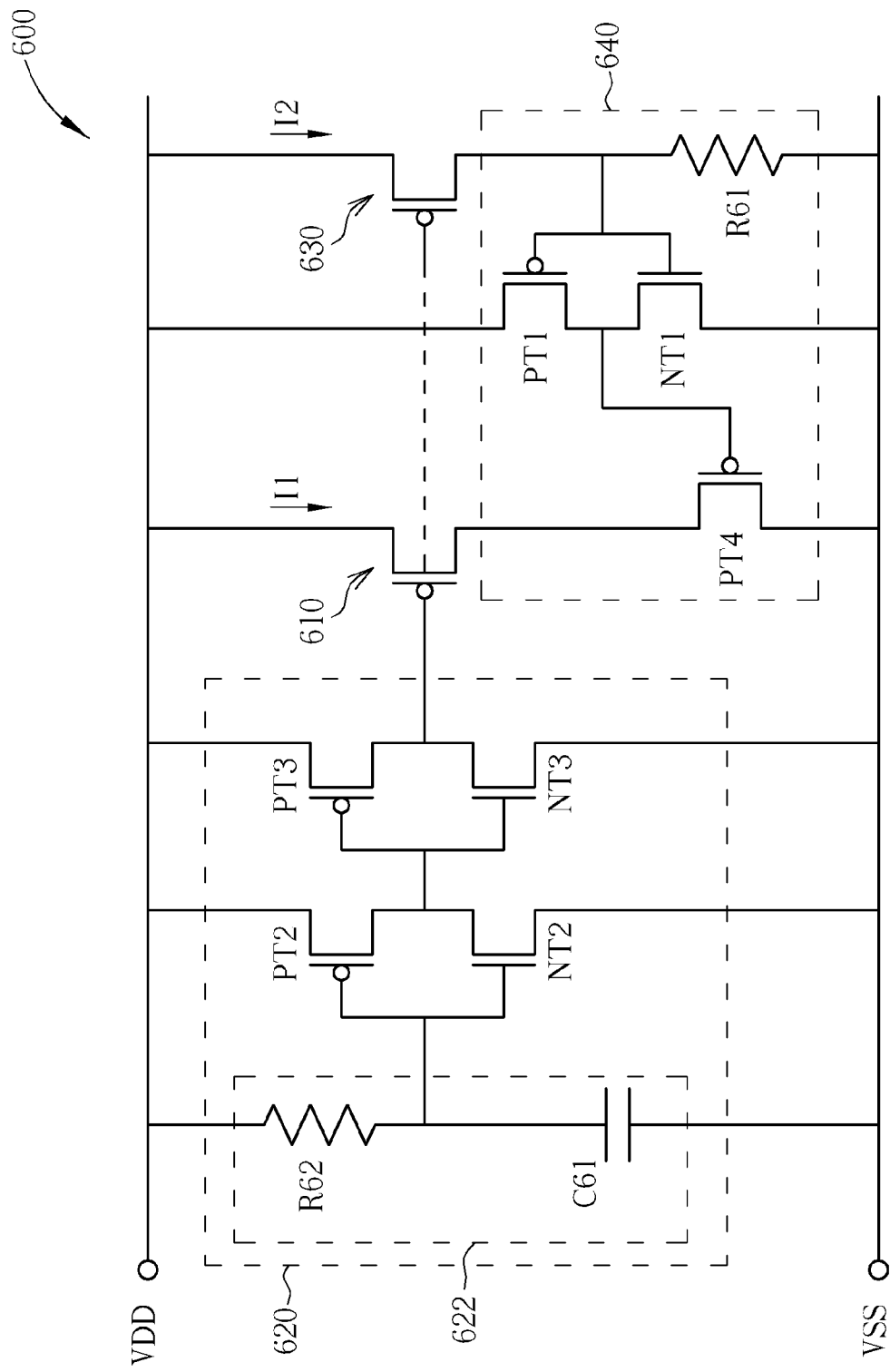
FIG. 6 is a diagram showing a third embodiment of an electrostatic protection circuit of the present invention.

Please refer to FIG. 6, which is a diagram showing a third embodiment of an electrostatic protection circuit of the present invention. In FIG. 4 and FIG. 5, the strained transistor arrays 410 and 510 are N-type strained transistor arrays, and the unstrained transistors 430 and 530 are N-type transistors. In FIG. 6, a strained transistor arrays 610 is a P-type strained transistor array, and an unstrained transistor 630 is an N-type transistor. Similar to the electrostatic protection circuit 500 of FIG. 5, the electrostatic protection circuit 600 of FIG. 6 also comprises the strained transistor arrays 610, the unstrained transistor 630, a trigger circuit 620 and a control circuit 640. The trigger circuit 620 is for controlling on and off states of the strained transistor array 610 and the unstrained transistor 630 according to a voltage value of the bias terminal VDD. The control circuit 640 is for controlling impedance between a second end of the strained transistor array 610 and the ground terminal VSS according to current flowing through the unstrained transistor 630. A P-type transistor PT4 can be utilized as a variable impedance element of the control circuit 640. When the P-type transistor PT is turned on, the impedance between the second end of the strained transistor array 610 and the ground terminal VSS becomes smaller; and when the P-type transistor PT is turned off, the impedance between the second end of the strained transistor array 610 and the ground terminal VSS becomes larger. Operation theory of the electrostatic protection circuit 600 shown in FIG. 6 is similar to operation theory of the electrostatic protection circuit 500 shown in FIG. 5, therefore, illustration of the electrostatic protection circuit 600 is not further provided.

The design of the above trigger circuit and the control circuit is for illustrating the operation theory of the electrostatic protection circuit of the present invention. The trigger circuit and the control circuit of the electrostatic protection circuit of the present invention are not limited to the above design. In addition, the unstrained transistor can be formed within an area of the strained transistor array during semiconductor manufacturing processes.

Summarizing the above, the electrostatic protection circuit of the present invention utilizes the strained transistor array to increase electrostatic protection ability of the electrostatic protection circuit. In addition, the electrostatic protection circuit of the present invention is able to control the impedance between the strained transistor array and the ground terminal according to the current flowing through the unstrained transistor, in order to prevent the latch-up effect of the electrostatic protection circuit, and protect the strained transistor array from being damaged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrostatic protection circuit capable of preventing latch-up effect, comprising:
   a strained transistor array with a first end electrically connected to a bias terminal;
   an unstrained transistor with a first end electrically connected to the bias terminal; and
   a control circuit electrically connected to a second end of the strained transistor array, a second end of the unstrained transistor and a ground terminal, for controlling impedance between the second end of the strained transistor array and the ground terminal according to current flowing through the unstrained transistor.

2. The electrostatic protection circuit of claim 1, further comprising a trigger circuit electrically connected to a control end of the strained transistor array and a control end of the unstrained transistor, for controlling on and off states of the strained transistor array and the unstrained transistor according to a voltage value of the bias terminal.

3. The electrostatic protection circuit of claim 1, further comprising a delay element for controlling on and off periods of the strained transistor array and the unstrained transistor.

4. The electrostatic protection circuit of claim 3, wherein the delay element comprises a resistor and a capacitor.

5. The electrostatic protection circuit of claim 1, further comprising a resistor electrically connected between a control end of the unstrained transistor and the ground terminal.

6. The electrostatic protection circuit of claim 5, wherein a control end of the strained transistor array is electrically connected to the ground terminal.

7. The electrostatic protection circuit of claim 1, wherein a control end of the strained transistor array is electrically connected to the ground terminal.

8. The electrostatic protection circuit of claim 1, wherein the control circuit comprises:
   a P-type transistor with a source end electrically connected to the bias terminal, and a gate end electrically connected to the second end of the unstrained transistor;
   an N-type transistor with a drain end electrically connected to a drain of the P-type transistor, a gate end electrically connected to the second end of the unstrained transistor, and a source end electrically connected to the ground terminal;
   a resistor electrically connected between the second end of the unstrained transistor and the ground terminal; and
   a variable impedance element electrically connected between the second end of the strained transistor array and the ground terminal, a control end of the variable impedance element electrically connected to the drain end of the P-type transistor.

9. The electrostatic protection circuit of claim 8, wherein the variable impedance element is a variable resistor.

10. The electrostatic protection circuit of claim 8, wherein the variable impedance element is a transistor.

11. The electrostatic protection circuit of claim 1, wherein the strained transistor array is a P-type strained transistor array, and the unstrained transistor is a P-type unstrained transistor.

12. The electrostatic protection circuit of claim 1, wherein the strained transistor array is an N-type strained transistor array, and the unstrained transistor is an N-type unstrained transistor.

13. A method for performing electrostatic protection, the method comprising:
   providing an electrostatic protection circuit, the electrostatic protection circuit comprising a strained transistor array coupled between a bias terminal and a ground terminal, and an unstrained transistor coupled between the bias terminal and the ground terminal; and
   controlling impedance between the strained transistor array and the ground terminal according to current flowing through the unstrained transistor.

14. The method of claim 13, wherein controlling impedance between the strained transistor array and the ground terminal according to current flowing through the unstrained transistor comprises reducing the impedance between the strained transistor array and the ground terminal if the current flowing through the unstrained transistor is greater than a predetermined value.

15. The method of claim 13, wherein controlling impedance between the strained transistor array and the ground terminal according to current flowing through the unstrained transistor comprises increasing the impedance between the strained transistor array and the ground terminal if the current flowing through the unstrained transistor is smaller than a predetermined value.

* * * * *